United States Patent [19]

Gutman et al.

[11] Patent Number: 4,940,963
[45] Date of Patent: Jul. 10, 1990

[54] PAGING SYSTEM WITH IMPROVED ACKNOWLEDGE-BACK CAPABILITIES

[75] Inventors: Jose Gutman, Boynton Beach; Steven C. Shapiro, Lake Worth, both of Fla.

[73] Assignee: Motorola Inc., Schaumburg, Ill.

[21] Appl. No.: 322,159

[22] Filed: Mar. 10, 1989

[51] Int. Cl.$^5$ .............................................. H04Q 7/00
[52] U.S. Cl. ................................. 340/313; 340/311.1; 340/825.44; 379/57
[58] Field of Search ................ 340/311.1, 313, 825.44, 340/825.47, 825.48; 379/56, 57

[56] References Cited

U.S. PATENT DOCUMENTS

| | | | |
|---|---|---|---|
| 4,172,969 | 10/1979 | Levine et al. | 340/825.44 |
| 4,263,480 | 4/1981 | Levine | 379/57 |
| 4,336,524 | 6/1982 | Levine | 340/311.1 |
| 4,517,561 | 5/1985 | Burke et al. | 340/825.49 |
| 4,644,351 | 2/1987 | Zabarsky et al. | 340/825.44 |
| 4,811,379 | 3/1989 | Grandfield | 340/825.44 |
| 4,814,763 | 3/1989 | Nelson et al. | 340/825.44 |

*Primary Examiner*—Joseph A. Orsino
*Assistant Examiner*—Geoff Sutcliffe
*Attorney, Agent, or Firm*—Donald B. Southard

[57] ABSTRACT

A paging system comprising a centrally located terminal and a plurality of remote pager units is disclosed wherein both automatic and manual acknowledge back signalling is provided. An appropriate acknowledge back signal by a called pager within a set interval indicates the message was duly received and understood which is so indicated to the initiating caller. Failure to respond within the set interval causes the pager unit to send back a negative response which is likewise so indicated to the initiating caller.

22 Claims, 5 Drawing Sheets

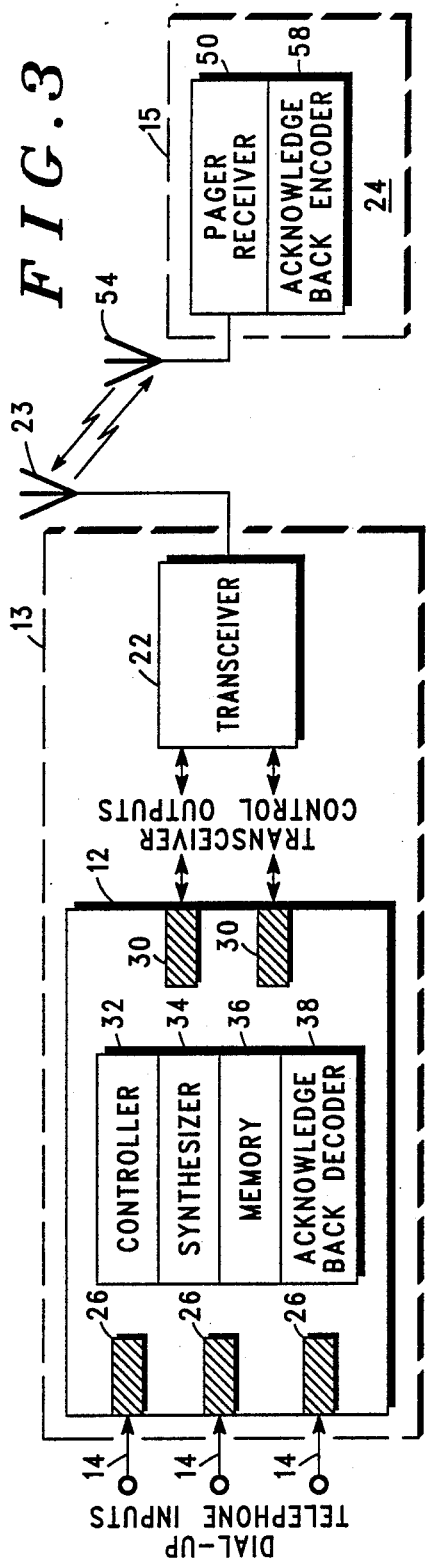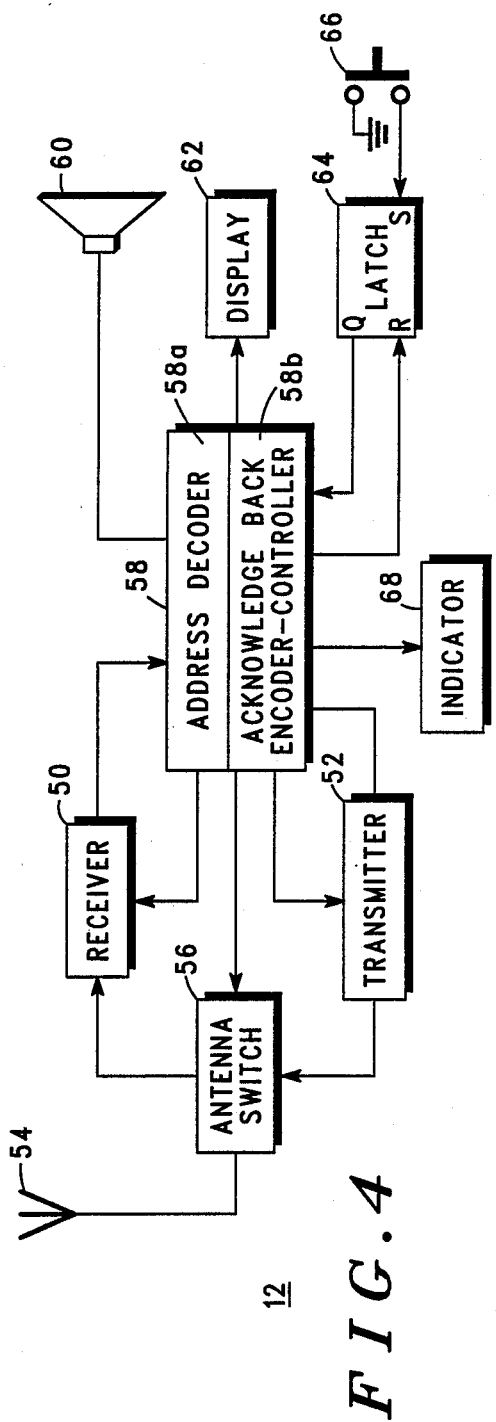

PAGING SYSTEM WITH IMPROVED ACKNOWLEDGE-BACK CAPABILITIES

BACKGROUND OF THE INVENTION

This invention relates in general to paging systems and more particularly to such systems with acknowledge-back capabilities. In the disclosed system an arrangement is provided to aid the wearer or user as to whether, following a first, automatic acknowledge-back response is made, a separate and additional acknowledge-back signal is required and if so, when to send it and when not to send it. The system also advises the originating caller as to whether the intended message was successfully received or not.

Paging systems have progressed over the years in both frequency and extent of usage as well as complexity. They have indeed become an indispensable tool for business. In addition, many different types of paging receivers have been developed. There are tone-only pagers, as well as tone and voice and, of more recent vintage the display pager which is capable of receiving data messages and displaying the same in appropriate alphanumeric form. Moreover, the mechanisms for originating the paging messages are likewise many and varied. A call may be made by voice using a standard telephone unit, or such call may be made by a specialized paging terminal or video display terminal.

All the foregoing different types of paging receivers may be intermixed in a single system, or such system may be populated by only a single type of paging receiver. In any event, for those receivers which are capable of an acknowledge-back feature, there are steps in the procedure which may well intend to confuse such user. For example, the user may not be confident as to whether or not a separate manual response is expected. If so when to press the acknowledge-back button is a further concern because it must be effected within a predetermined time window.

From the originating call side, i.e., the base station site, as well as for the originating caller, the question is, did the pager/user, upon being addressed (called), receive such address and is he/she in a position/condition to receive and understand the intended message to follow. For example, the paging receiver may be sitting on a desk by itself remote from the location of the person or user. In this case, the pager itself, if turned on, is capable of receiving paging calls, but the pager user is not, because he or she is at some other location. Similarly, the paging receiver may be in a battery charger and likewise capable of receiving and indicating an automatic acknowledge-back signal, but the user is not in a position to receive the intended message. Further, the pager may be on the person of the user and capable of momentarily receiving a signal and responding with an automatic acknowledge-back signal, but moments later having the propagation path degraded by a steel beam in an office building or the like. Sending an intended message at that particular juncture would mean the same would simply be lost.

Accordingly, it will be seen that notwithstanding a pager's capability of automatically acknowledging back a response signal to a receive address call, there is indeed a good deal of uncertainly and, in some cases, confusion regarding the users responsibility, and the paging system with such automatic acknowledge-back capability, in terms of what further response is expected from him/her as well as what time it is to be effected.

Further, there is also some uncertainty at the central or base-site location from where a page is transmitted and particularly with respect to the originator of the call regarding whether or not the pager user being called is ready and capable of receiving, or has received and understood a particular transmitted message. Notwithstanding the fact that an address was transmitted and received by the pager being called and an automatic acknowledge-back signal being sent, the central station/telephone caller originating the call needs to know that a response has been effected by the pager user, whether it be an affirmative or a negative response. An "affirmative acknowledge" response indicates the user has received the message and has duly responded; a negative response indicates confirmation is lacking.

SUMMARY OF THE INVENTION

Accordingly, it is an object of the present invention to provide a closed-loop acknowledge-back paging arrangement and method which overcomes the foregoing deficiencies.

A more particular object of the present invention is to provide a paging system of the foregoing type wherein the pager user by way of an included indicator may be advised and "walked through" an appropriate acknowledge-back manual response procedure, both in terms of how to respond and when to respond.

A further object of the present invention is to provide a paging system of the foregoing type wherein positive feedback is utilized in the system to minimize potential confusion for all particularized parties, such that the pager user has received an intended message and responded affirmatively and further, when such pager user responds negatively.

In practicing the invention, a paging system is provided wherein a plurality of associated paging receivers have the capability of automatic acknowledging-back and wherein such pagers are further provided with visual and audible indicator means, along with a manual operating button for a further manual acknowledge-back response. When the pager receives a call (address), an automatic acknowledge-back signal is generated and sent. Further, a time window is established during the interval of a following message and a pre-determined time thereafter, such that manual responding during such interval confirms receipt of such message, with the same being relayed to the originating caller by the paging system, and wherein failure to so respond during the interval indicates such message was not received and/or understood, with such also being relayed to the originating caller.

A method is provided for effecting such response and advising the pager wearer if such manual response is required and, if so, when to operate an associated manual pushbutton to send such response.

BRIEF DESCRIPTION OF THE DRAWINGS

The features of the present invention which are believed to be novel are set forth with particularity in the appended claims. The invention itself, however, together with further objects and advantages thereof may be best understood by reference to the accompanying drawings in which:

FIG. 3 is a partial graphic and block diagram of the paging terminal and calling unit portion of the system of FIG. 1;

FIG. 4 is a block diagram of a system pager showing both automatic and manual ack-back capabilities and the means for effecting the same;

DETAILED DESCRIPTION OF THE PREFERRED EMBODIMENT

Figure 8:
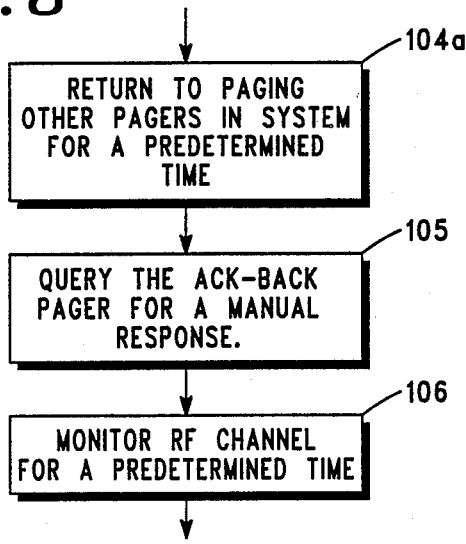
FIG. 8 is a flow chart of a modification to the procedural steps of FIG. 7 to provide for a specific query signal to be generated and sent for the expected manual response.

Referring now to the drawings a paging system is shown in FIG. 8, which system has been here constructed in accordance with the present invention and includes the capability of automatic as well as manual acknowledge back (ACK-BACK) signal response.

The system 10 may include a paging controller console or terminal 12 which may receive incoming calls at a telephone input port 14 from, first, human callers utilizing conventional or standard telephone handset 16 or, secondly, from personal computers or video display terminals depicted at 18, or thirdly, from page entry terminals as shown at reference 20.

Console terminal 12 will process the paging request, extract the appropriate address from internal memory and activate the paging transmitter 22 to broadcast the intended paging call, and which in turn is received by the appropriate system pager for processing the information and alerting the paging receiver wearer or user. As will be understood, the pagers of the system may be of tone only type, as depicted at 24a, a tone and voice pager, as indicated at 24b or an alphanumeric display type, as shown at 24c. As mentioned previously, the system 10 may comprise different types of these referenced pagers intermixed within the system, or it may be populated by only a particular type of pagers. But in any event, each of these pagers within system 10 is equipped to respond with an automatic ack-back signal upon being paged (addressed) by the central base station or transmitter 22.

Figure 1:
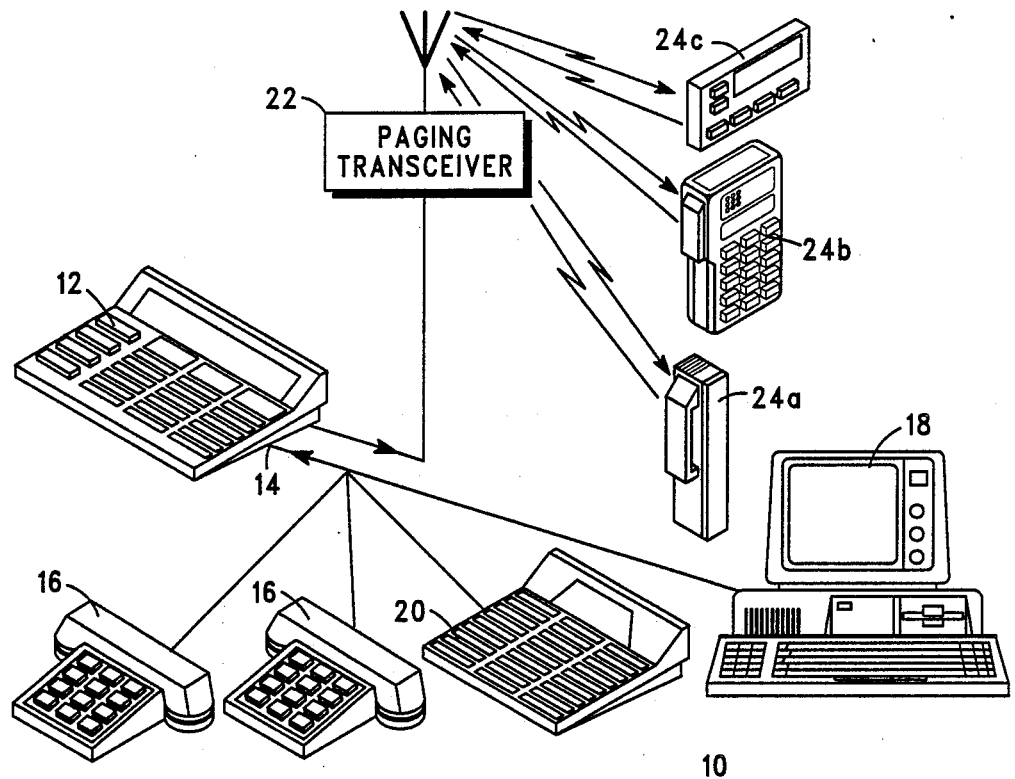
FIG. 1 is a graphic representation of a paging system having automatic acknowledge-back capability, which system has been constructed in accordance with the present invention.
Figure 2:
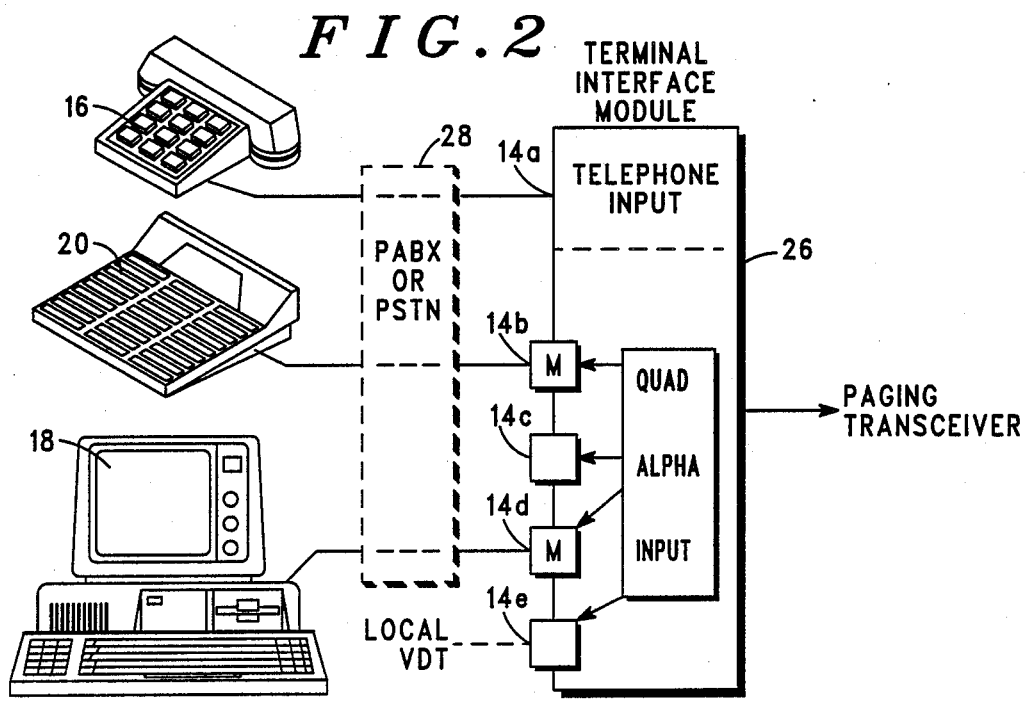
FIG. 2 is a diagrammatic representation of the system of FIG. 1 indicating acknowledge-back capability between the base site apparatus and each of the system pagers.

As well known, and as illustrated in FIG. 2, a terminal interface module 26 accepts incoming calls from a PABX or a public switch telephone network (PSTN) shown in dotted line at 28, which in turn interfaces with a standard telephone device 16, a personal computer or video display terminal 18, and/or a page entry terminal (PET) 20. If the incoming call is from a standard telephone unit, it is processed by the module interface 26 from an included DTMF decoder (not shown) connected to input port 14A. If the incoming call is from a VDT 18 or PET 20 an internal modem in the module interface effects the processing as indicated at inputs 14b and 14d by the reference "M".

As best seen in FIG. 3, the terminal 12, in addition to one or more interface modules 26, further includes a controller 32, a synthesizer 34, a memory 36 and an acknowledge back decoder 38. With the exception of the ack-back decoder 38, the other referenced component parts functioned to essentially route the incoming paging request at a port 14 on the input side to the transmitter control ports 30 on the output side. Controller 32 serves as the "brain" of the system and includes a microprocessor (not specifically shown), while the synthesizer 34 generates the sometimes required paging tones constituting the pagers address contained within memory 36 along with other system parameters and relevant subscriber information. The ack-back decoder 38 receives the various ack-back signals from the systems pagers which are utilized to determine the degree of confidence as to whether a particular paging message was received and understood by the pager wearer, as will be described hereinafter. In any event, terminal 12 along with transmitter 22 and associate antenna 23 constitute the base site or system side 13 of the paging system 10.

The pager-side 15 of system 10 comprises the paging receiver portion 50, the included ack-back encoder 58 and associated antenna 54. A more detailed representation of a system pager is shown in FIG. 4. In addition to the foregoing, the overall pager unit 24 further includes an antenna switch 56, a transmitter portion 52, a speaker 60, a display 62, if of the numeric or alphanumeric type, and a latch 64 and manual button 66 coupled to the ack-back encoder-controller 58b and a manual response indicator 68. Indicator 68 may be an LCD segment or an LED displayed on the outer pager housing. Additionally, it may also include an audible transducer normally already a part of the pager unit.

In operation, incoming calls are accepted at the appropriate input ports 14 and are subsequently processed by the controller 32, which, say for example, has a call from a standard telephone for a conventional tone and voice page, generates the necessary tones for the intended pager as taken from memory 36. These tones are outputted on the output control lines to transmitter 22 and broadcast by the antenna 23. The address is received by page antenna and is processed by the pager receiver portion 50. Upon being decoded and recognized by address decoder 58a, an automatic ack-back signal is generated and transmitted back to terminal 12 by pager transmitter portion 52, which is received and processed by ack-back decoder module 38. No action is required by the pager user for this sequence of automatically responding and requires only that the pager 24 be turned on and receive the particular address signal.

Upon receipt and processing of the automatic ack-back response from pager 24 by terminal 12, the intended message may then be transmitted to pager 24 in like fashion. During the time for processing the message, and for a predetermined period thereafter, which constitutes a response interval, the pager wearer may activate manual pushbutton 66 to generate a further and manual ack-back response. When received and processed at the base-central site, it is indicative of the condition that the page message was duly received and understood by the intended pager wearer. Accordingly, the originating caller may be so advised by a pre-programmed message stored in terminal 12.

Failure to receive the second, manual response during the referenced response interval, by the terminal 12 following transmission of the intended message, is indicative of the fact that the message for some reason was not properly received and/or the response was obstructed from transmission back to the central paging terminal. Again, the originating caller may be so advised by pre-programmed stored message in terminal 12. In the latter event, the caller may be queried as to whether he or she wishes an immediate retry regarding the referenced page message, or wishes to wait for some later time. In any case, the originating caller is advised of the specific status of the paging call. Either it is received and understood, or it is not.

As mentioned previously, a significant problem in paging systems with ack-back capabilities is the user uncertainty as to whether a further ack-back response, in addition to the first automatic response, is in order, and, if so, when should such additional manual response be effected.

Figure 5:
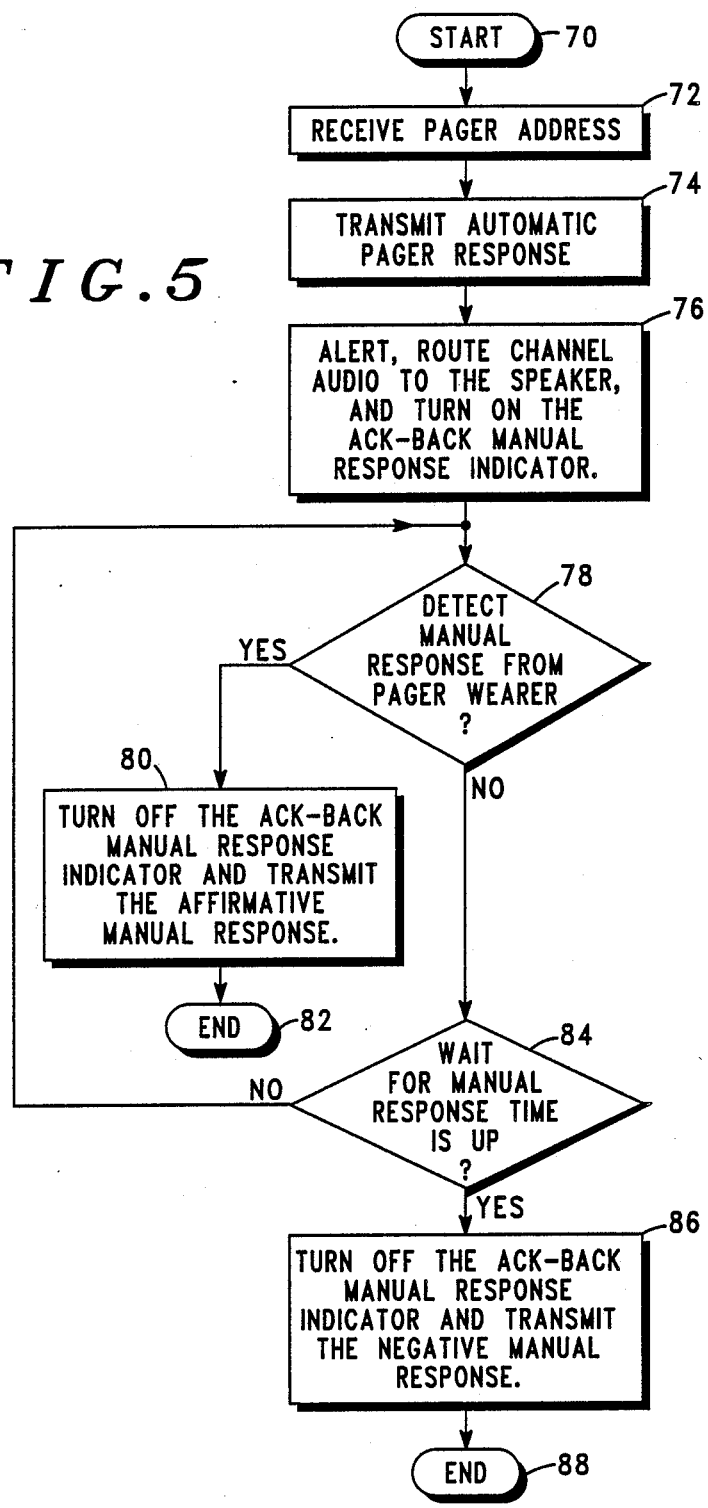
FIG. 5 is a flow chart showing the procedural steps for effecting the ack-back responses from the pager-side for a tone and voice page.

In the paging system of the present arrangement, the pager wearer is guided through the required procedure both as to whether a manual response is to be made, and if so, when. This is shown more clearly by reference to the flow chart of FIG. 5 representing the pager side of the ack-back signal responses to be effected in the system 10.

As shown, the process or routine begins at step 70 followed by the receipt of a pager address by pager 24 at step 72. Upon processing and recognition by the pager 24, an automatic ack-back response is generated via the receiver's encoder-controller module 58b at step 74. The controller portion thereof effects the alert and routing of the audio to the pager speaker 60 at step 76 and further turns "on" the manual response indicator 68. This advises the pager wearer that a further, manual ack-back action on his or her part is required. If the pager wearer then activates push button 66 so as to initiate a further (manual) ack-back response at step 78, the pager 24 then effects the transmission of a manual response of the affirmative type at step 80. This response, as previously referenced, may be made at any time during the time the intended message is being received and processed by pager 24 and for some set pre-determined time thereafter. Upon the pager wearer activating the pushbutton 66 during this interval, to effect the intended response, the pager turns "off" the manual response indicator, also in step 80, and ends the routine at step 82.

However, if the pager 24 fails to detect the activation of pushbutton 66, it waits until the expiration of the response interval at step 84. Thereupon it turns off the manual response indicator and transmits a negative manual response at step 86, whereupon the routine may be terminated at step 88.

From the base or central side, the routine begins at step 90, whereupon the particular pager address is transmitted at step 92. The channel is then monitored at step 94 for a given time during which an automatic ack-back signal may be expected to be received at step 96 for the pager 24 being paged. If the automatic ack-back signal is not received by terminal 12 within the time set in step 98, the terminal 12 determines that the pager is not in service and so advises the caller by a pre-programmed message stored therein as indicated in step 100, whereupon the routine is ended at step 102.

If, however, the automatic ack-back response is received at step 96, the intended message may then be transmitted at step 104. The channel is then monitored for a pre-determined time at step 106. If the manual ack-back response is not detected within the time period set in step 110, the terminal 12 determines that "no response is received" (no affirmative, no negative response) and so advises the originating caller, as indicated at step 112, whereupon the routine is ended at step 114. As indicated, a program may be set to resend the page if no response is initially received in step 112.

Alternatively, if the second (manual) ack-back response is received by the terminal 12 at step 108, the terminal further determines whether such response is a response in the affirmative, see step 80 in FIG. 5, or a negative response, as in step 86. If the manual ack-back response is in the affirmative sense, terminal 12, by pre-programmed stored message, advises the originating caller at step 118 that an affirmative message has in fact been received. If the manual ack-back response is in the negative sense, the originating caller is so advised at step 120 accordingly. In either event, the routine is ended at step 122.

There is still one other aspect that needs to be considered for a paging systems of this type. This is the matter of setting the response interval for manually responding back. As previously described, this interval may conveniently begin with the transmission and reception of the intended message by the called pager and for a predetermined time thereafter. However, in very busy systems, setting this interval routinely may result in less efficiency than may otherwise be obtained.

Figure 7:
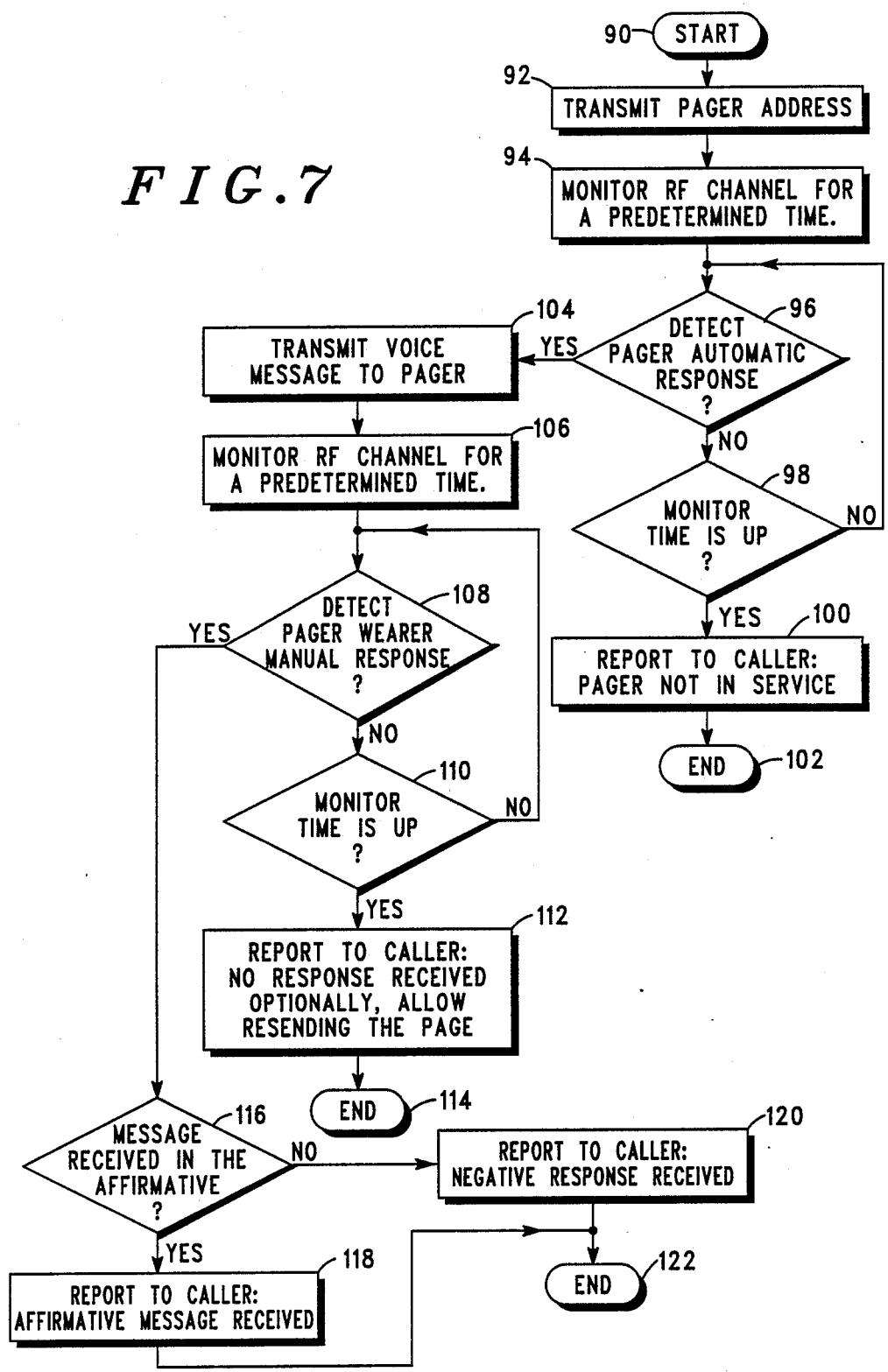
FIG. 7 is a flow chart showing the procedural steps for effecting the required ack-back response from the system or base station side for a tone and voice page.

As an alternative to this preset interval, the paging system, or more accurately, the controller 32 of terminal 12, may effect a specific query of a call pager for a manual ack-back response at a selected but not preordained time. This is reflected in FIG. 8 where, after transmitting the intended voice message, following the receipt of the automatic ack-back response in step 104 of FIG. 7, terminal 12 may then return to paging still other pagers in the system as indicated at step 104a. At an appropriate but variably selected time, terminal 12 may query a particular system pager for the required manual ack-back response as indicated at step 105. It is to be understood that the manual response interval may be set independent of the query signal transmitted by the terminal 12, if so desired. The pushbutton 66 may be activated during the set interval, but the pager 24 simply notes such action. The actual manual ack-back response is not sent by the pager until the query signal is received. When such query signal is transmitted it is selected by the terminal 12. This query signal may comprise the pager's address and certain additional information which instructs the pager not to alert but only to activate the manual response indicator 68 on pager 24. Terminal 12 then monitors the channel for some predetermined time, the same as in step 106 of FIG. 7, and the routine then continues in the same manner as previously described.

Figure 6:
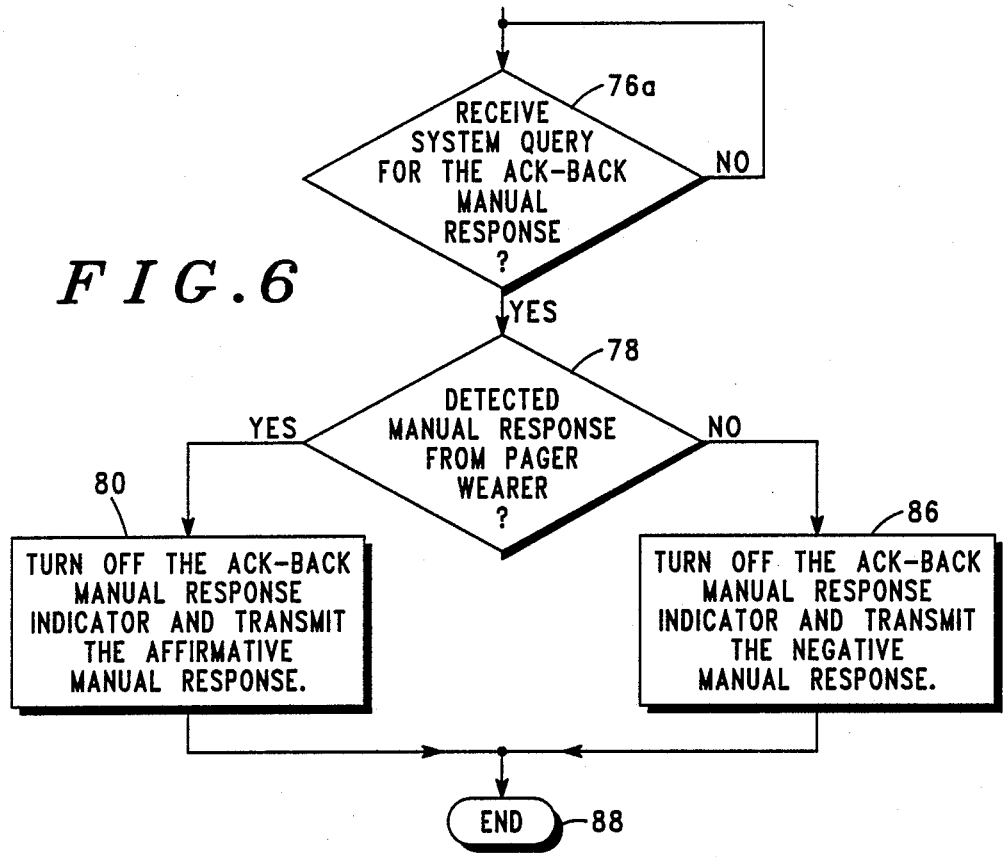
FIG. 6 is a flow chart of a modification to the procedural steps of FIG. 5 for a very busy system in which a specific query signal is required for ack-back manual response.

At the pager side, the pager address is received and an automatic response initiated at steps 72 and 74 as previously described in FIG. 5. At step 76, however, the pager alerts and routes the audio to the pager speaker, and the manual indicator is activated at this time. At some time subsequent, as indicated at step 76a, FIG. 6, a system query signal is specifically transmitted and received by pager 24. As in step 78, FIG. 5, the pager 24 determines whether or not the pager wearer has activated the push button 66 or not. If yes, a response in the affirmative sense is transmitted back at step 80, and if not, a response in the negative sense is transmitted back at step 86, whereupon the routine may then be ended as before at step 88.

Accordingly what is claimed is:

1. In a paging system with a central base station and a plurality of remote pager units, an arrangement for indicating the status of a particular paging call, comprising in combination:
   indicator means on the pager unit;
   means for receiving a paging signal by the pager, activating said indicator means for a set interval, and sending back an automatic response thereto to indicate a received address;
   means for receiving an associated message by the pager; and
   means for manually responding or not responding during said set interval,
   by manually responding during said interval, an affirmative response is sent back to the base station as an indication that said message has been received and which is so indicated to the initiating caller,
   by not manually responding within said interval, a negative response is sent back to the base station which is likewise indicated to the initiating caller.

2. An arrangement for indicating the status of a paging call in a paging system in accordance with claim 1 wherein the means for manually responding during said set interval includes a manually operated pushbutton on the pager unit.

3. An arrangement for indicating the status of a paging call in a paging system in accordance with claim 1 wherein the set interval for manually responding includes the time during the receipt of said associated message and for a predetermined time thereafter.

4. An arrangement for indicating the status of a paging call in a paging system in accordance with claim 1 wherein said indicator means is activated upon the receipt of said message and remains active for said set interval to both indicate to the pager wearer that a manual ack-back response is expected as well as when such response must be made.

5. An arrangement for indicating the status of a paging call in a paging system in accordance with claim 1 wherein said indicator means may be visual, audible or both.

6. An arrangement for indicating the status of a paging call in a paging system in accordance with claim 5 wherein said visual indicator means is an LCD segment or an LED device.

7. An arrangement for indicating the status of a paging call in a paging system in accordance with claim 5 wherein said audible indicator means is a transducer device.

8. An arrangement for indicating the status of a paging call in a paging system in accordance with claim 5 wherein said indication to the initiating caller is made by preprogrammed message stored in the central base station.

9. An arrangement for indicating the status of a paging call in a paging system in accordance with claim 1 wherein failure by the base station to receive back either an affirmative response or a negative response within a set time period is interpreted as the associated message not being properly received or an obstruction occurring to prevent transmission by the pager unit to the base station.

10. In a paging system with a central base station and a plurality of remote pager units, a method of responding back by a remote pager user to indicate status of a particular paging call, comprising the steps of:
    providing indicator means on the pager unit;
    receiving a paging signal by the pager, activating said indicator means for a set interval, and sending back an automatic response thereto to indicate a received address; and
    receiving an associated message and either manually responding affirmatively or not responding during said set interval,
    by responding during said set interval, an affirmative response is sent back to the base station as an indication that said message has been duly received and which is so indicated to the initiating caller,
    by not manually responding within said set interval, a negative response is sent back to the base station which is likewise indicated to the initiating caller.

11. A method for indicating the status of a paging call in a paging system in accordance with claim 10 wherein said manual response during said set interval is effected by an included manually operated pushbutton on the pager unit.

12. A method for indicating the status of a paging call in a paging system in accordance with claim 10 wherein said set interval upon manual responding includes the time during the receipt of the associated message and for a pre-determined time thereafter.

13. A method for indicating the status of a paging call in a paging system in accordance with claim 10 wherein keeping said indicator means activated for the said interval is to both indicate to the page wearer that a manual ack-back response is expected as well as when such response must be made.

14. A method for indicating the status of a paging call in a paging system in accordance with claim 10 which includes the step of providing said indicator means in visual or audible form, or both.

15. A method for indicating the status of a paging call in a paging system in accordance with claim 10 wherein either step of indicating the status of a referenced message to the initiated caller is by pre-programmed message stored in the central base station.

16. A method for indicating the status of a paging call in a paging system in accordance with claim 10 wherein the failure of the central base station to receive back either an affirmative or a negative response within a set time period will be interpreted as the associated message not being properly received or as an obstruction occurring to prevent transmission by the pager unit to the base station.

17. In a paging system with a central base station and a plurality of remote pager units, each such pager having an automatic acknowledgement response capability as well as a manual acknowledgement response capability initiated by activation of an associated pushbutton, an arrangement for indicating the status of a particular paging call, comprising in combination:
    indicator means on the pager unit;
    means for receiving a paging signal by the pager, activating said indicator means for a set interval, and sending back an automatic response thereto to indicate a received address; and
    means for receiving an associated message and determining whether said pushbutton is operated during the time said indicator means remains activated; and means for receiving a query signal regarding the said referenced message for sending back an affirmative or negative response;

a response in the affirmative sense is sent if said pushbutton was operated during said interval said indicator means was activated to serve as an indication that said message was duly received and which is so indicated to the initiating caller, a negative response is sent if said pushbutton was not timely operated, which is likewise indicated to the initiating caller.

18. An arrangement for indicating the status of a paging call in a paging system in accordance with claim 17 wherein said query signal includes the pager address and other signal information instructing the called pager to inhibit paging alert and to transmit back the affirmative or negative response.

19. An arrangement for indicating the status of a paging call in a paging system in accordance with claim 17 wherein said query signal is transmitted by the central base station at a selected time based on the level of on-going page call traffic.

20. In a paging system with a central base station and a plurality of remote pager units, each such pager having an automatic acknowledgement response capability as well as a manual acknowledgement response capability initiated by activation of an associated pushbutton, a method of responding back by a remote pager user to indicate status of a particular paging call, comprising the steps of:

providing indicator means on the pager unit;

receiving a paging signal by the pager activating said indicator means for a set interval, and sending back an automatic response thereto to indicate a received address; and receiving and associated message and determining whether said pushbutton is operated during the time said indicator means remains activated;

receiving a query signal regarding the said referenced message and sending back an affirmative or negative response, a response in the affirmative sense being sent if said pushbutton was operated during the interval said indicator means was activated to serve as an indication that said message was duly received, which is then indicated to the initiating caller, a negative response being sent if the pushbutton was not timely operated, which is likewise indicated to the initiating caller.

21. A method for indicating the status of a paging call in a paging system in accordance with claim 20 which includes the further step of forming said query signal with the pager's address and other signal information instructing the called pager to inhibit paging alert and to transmit back the affirmative or negative response.

22. A method for indicating the status of a paging call in a paging system in accordance with claim 20 which includes the further step of transmitting said query signal at the central base station at a selected time based on the level of on-going page call traffic.

* * * * *